United States Patent
Tsuda

(10) Patent No.: US 11,201,632 B2
(45) Date of Patent: Dec. 14, 2021

(54) HIGH-FREQUENCY FRONT-END MODULE AND COMMUNICATION DEVICE

(71) Applicant: Murata Manufacturing Co., Ltd., Kyoto (JP)

(72) Inventor: Motoji Tsuda, Kyoto (JP)

(73) Assignee: MURATA MANUFACTURING CO., LTD., Kyoto (JP)

(*) Notice: Subject to any disclaimer, the term of this patent is extended or adjusted under 35 U.S.C. 154(b) by 0 days.

(21) Appl. No.: 16/950,985

(22) Filed: Nov. 18, 2020

(65) Prior Publication Data

US 2021/0075450 A1   Mar. 11, 2021

Related U.S. Application Data

(63) Continuation of application No. PCT/JP2019/019713, filed on May 17, 2019.

(30) Foreign Application Priority Data

Jun. 4, 2018 (JP) .............................. JP2018-106933

(51) Int. Cl.
*H04B 1/04* (2006.01)
*H04B 1/16* (2006.01)
*H04B 1/7093* (2011.01)

(52) U.S. Cl.
CPC .............. *H04B 1/04* (2013.01); *H04B 1/1607* (2013.01); *H04B 1/7093* (2013.01); *H04B 2001/0408* (2013.01)

(58) Field of Classification Search
CPC ...... H04B 1/04; H04B 1/1607; H04B 1/7093; H04B 2001/0408; H04B 1/0064; H04B 1/0057; H04B 1/525; H04B 1/401
See application file for complete search history.

(56) References Cited

U.S. PATENT DOCUMENTS 9,762,274 B2 * 9/2017 Rai ..................... H04B 1/0475
10,979,021 B2 * 4/2021 Pfann ................. H03H 9/02007
(Continued)

FOREIGN PATENT DOCUMENTS

CN   106487394 A   3/2017
CN   107210775 A   9/2017
(Continued)

OTHER PUBLICATIONS

Machine translation of JP-2017-163232 A (Miyake Tomoyuki). (Year: 2017).*

(Continued)

*Primary Examiner* — Jean B Corrielus
(74) *Attorney, Agent, or Firm* — Pearne & Gordon LLP

(57) ABSTRACT

A high-frequency front-end module includes transmission amplifier circuits, a transmission filter that is connected between a common terminal and the transmission amplifier circuit and has a transmission band of a band A as a pass band, a reception filter that is connected to the common terminal and has a reception band of a predetermined communication band as a pass band, in which a frequency of an intermodulation distortion generated by a transmission signal from the transmission amplifier circuit and a transmission signal from the transmission amplifier circuit overlaps the pass band, and a band elimination filter that is disposed in a signal path connecting an output terminal of the transmission amplifier circuit and the transmission filter, and has a transmission band of the band A as a pass band and a transmission band of a band B as an attenuation band.

9 Claims, 7 Drawing Sheets

(56) References Cited

U.S. PATENT DOCUMENTS

| | | | |
|---|---|---|---|
| 2014/0328222 A1* | 11/2014 | Mao | H04B 1/525 |
| | | | 370/278 |
| 2016/0087658 A1* | 3/2016 | Weissman | H04B 1/10 |
| | | | 455/78 |
| 2016/0380652 A1 | 12/2016 | Anthony et al. | |
| 2017/0026136 A1 | 1/2017 | Thompson et al. | |
| 2017/0063427 A1 | 3/2017 | Lee et al. | |
| 2017/0302328 A1* | 10/2017 | Obiya | H04B 1/0057 |
| 2019/0222253 A1 | 7/2019 | Nagumo et al. | |

FOREIGN PATENT DOCUMENTS

| | | |
|---|---|---|
| JP | 2017017691 A | 1/2017 |
| WO | 2016117482 A1 | 7/2016 |
| WO | 2018061974 A1 | 4/2018 |

OTHER PUBLICATIONS

International Search Report issued in Application No. PCT/JP2019/019713, dated Jul. 16, 2019.
Written Opinion issued in Application No. PCT/JP2019/019713, dated Jul. 16, 2019.

\* cited by examiner

HIGH-FREQUENCY FRONT-END MODULE AND COMMUNICATION DEVICE

This is a continuation of International Application No. PCT/JP2019/019713 filed on May 17, 2019 which claims priority from Japanese Patent Application No. 2018-106933 filed on Jun. 4, 2018. The contents of these applications are incorporated herein by reference in their entireties.

BACKGROUND

The present disclosure relates to a high-frequency front-end module that processes a high-frequency signal, and a communication device.

It is required to apply a carrier aggregation (CA) scheme for simultaneously using different frequency bands (communication bands) to a high-frequency front-end module corresponding to multi-band and multi-mode.

Japanese Unexamined Patent Application Publication No. 2017-17691 (FIG. 2B) discloses a circuit configuration of an electronic system (high-frequency front-end module) having a first transmission circuit and a second transmission circuit. Specifically, the first transmission circuit includes a first power amplifier that amplifies a high-frequency signal in one frequency region (a first frequency band group), a first antenna switch, a first band selection switch that is disposed in a first signal path that connects the first power amplifier and the first antenna switch, and a plurality of first filters (duplexers) that is connected to the first band selection switch. The second transmission circuit includes a second power amplifier that amplifies a high-frequency signal in another frequency region (a second frequency band group), a second antenna switch, a second band selection switch that is disposed in a second signal path that connects the second power amplifier and the second antenna switch, and a plurality of second filters (duplexers) that is connected to the second band selection switch. According to this configuration, it is possible to realize so-called uplink carrier aggregation in which a first high-frequency transmission signal output from the first transmission circuit and a second high-frequency transmission signal output from the second transmission circuit are simultaneously transmitted.

However, in a case where the uplink carrier aggregation described above is performed, the second high-frequency transmission signal output from the second power amplifier propagates through the first signal path, and the second high-frequency transmission signal and the first high-frequency transmission signal that is output from the first power amplifier and propagates through the first signal path may cause an intermodulation distortion due to a non-linear operation of the first filter. Here, in a case where the frequency of the above intermodulation distortion overlaps a frequency of a pass band of one reception filter included in the first filter, there is a problem that the intermodulation distortion passes through the one reception filter, and reception sensitivity in a reception path in which the one reception filter is disposed deteriorates.

BRIEF SUMMARY

The present disclosure provides a high-frequency front-end module and a communication device in which deterioration of reception sensitivity due to intermodulation distortion of a plurality of transmission signals is suppressed.

A high-frequency front-end module according to an aspect of the present disclosure is a high-frequency front-end module capable of simultaneously performing transmission of a first transmission signal in a transmission band of a first communication band, transmission of a second transmission signal in a transmission band of a second communication band different from the first communication band, and reception of a reception signal in a reception band of a predetermined communication band, and includes a common terminal, a first transmission amplifier circuit having an input terminal and an output terminal and configured to amplify a high-frequency signal input to the input terminal and output the amplified high-frequency signal from the output terminal, a second transmission amplifier circuit configured to amplify and output a high-frequency signal, a first transmission filter connected between the common terminal and the first transmission amplifier circuit and having a transmission band of the first communication band as a pass band, and a first reception filter connected to the common terminal and having a reception band of the predetermined communication band as a pass band, in which the pass band of the first reception filter overlaps a frequency of an intermodulation distortion generated by the first transmission signal included in a high-frequency signal output from the first transmission amplifier circuit and the second transmission signal included in a high-frequency signal output from the second transmission amplifier circuit, and the high-frequency front-end module further includes a band elimination filter disposed in a signal path connecting the output terminal in the first transmission amplifier circuit and the first transmission filter, having a frequency band of the first transmission signal as a pass band, and having a frequency band of the second transmission signal as an attenuation band.

Other features, elements, characteristics and advantages of the present disclosure will become more apparent from the following detailed description of embodiments of the present disclosure with reference to the attached drawings.

DETAILED DESCRIPTION

Figure 1:
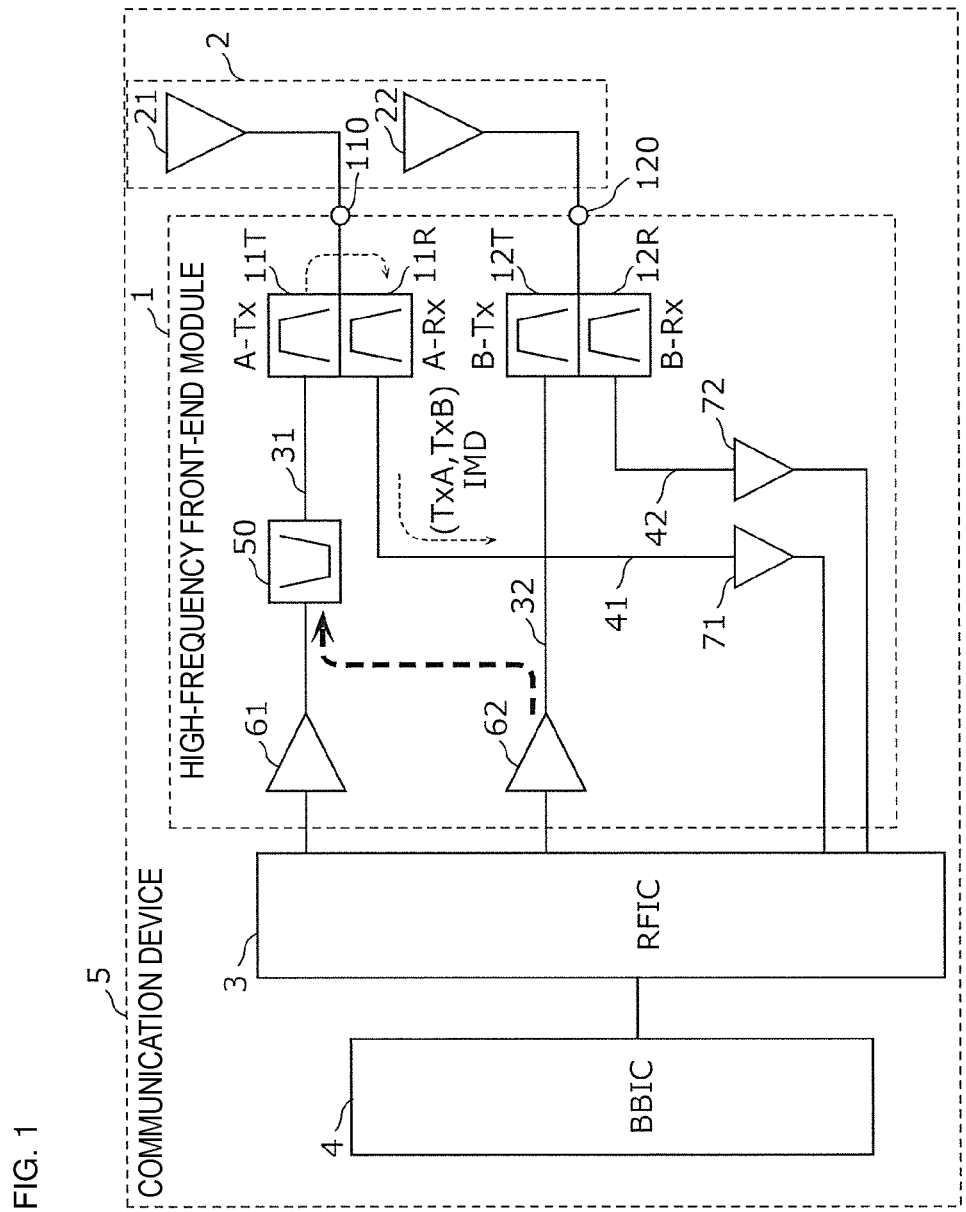
FIG. 1 is a circuit configuration diagram of a communication device according to Embodiment 1.

Hereinafter, embodiments of the present disclosure will be described in detail with reference to the accompanying examples and drawings. Note that the embodiments described below each represents a comprehensive or specific example. The numerical values, shapes, materials, constituent elements, arrangement and connection forms of the constituent elements, and the like described in the following embodiments are merely examples and are not intended to limit the present disclosure. Among the constituent elements in the following embodiments, constituent elements that are not described in the independent claims are described as optional constituent elements. In addition, the size or a ratio of the size of the constituent elements illustrated in the drawings is not necessarily strict.

Embodiment 1

1.1 Configuration of High-Frequency Front-End Module 1 and Communication Device 5

FIG. 1 is a circuit configuration diagram of a communication device 5 according to Embodiment 1. As illustrated in the figure, the communication device 5 includes a high-frequency front-end module 1, an antenna circuit 2, an RF signal processing circuit (RFIC) 3, and a baseband signal processing circuit (BBIC) 4.

The RFIC 3 is an RF signal processing circuit that processes a high-frequency signal transmitted and received by the antenna circuit 2. Specifically, the RFIC 3 performs signal processing on a high-frequency reception signal input via a reception signal path of the high-frequency front-end module 1 by down-conversion or the like, and outputs a reception signal generated by the signal processing to the BBIC 4. Further, the RFIC 3 performs signal processing on a transmission signal transmitted from the BBIC 4 by up-conversion or the like, and outputs a high-frequency transmission signal generated by the signal processing to a transmission signal path of the high-frequency front-end module 1.

The BBIC 4 is a circuit that performs signal processing by using an intermediate frequency band having a lower frequency than a high-frequency signal propagating through the high-frequency front-end module 1. The signal processed by the BBIC 4 is used, for example, as an image signal for image display, or is used as an audio signal for a call via a speaker.

Further, the RFIC 3 also has a function as a control unit that controls a connection of a switch circuit (not illustrated) included in the high-frequency front-end module 1 based on a communication band (frequency band) to be used. Specifically, the RFIC 3 switches the connection of the switch circuit included in the high-frequency front-end module 1 by a control signal (not illustrated). Note that the control unit may be provided outside the RFIC 3, and may be provided in, for example, the high-frequency front-end module 1 or the BBIC 4.

The antenna circuit 2 includes antenna elements 21 and 22. The antenna element 21 is connected to a common terminal 110 of the high-frequency front-end module 1, and preferentially radially transmits and receives a high-frequency signal in a predetermined frequency band including a band A, which will be described later. The antenna element 22 is connected to a common terminal 120 of the high-frequency front-end module 1, and preferentially radially transmits and receives a high-frequency signal in a predetermined frequency band including a band B, which will be described later.

Note that, in the communication device 5 according to the present embodiment, the antenna circuit 2 and the BBIC 4 are optional constituent elements.

Next, a detailed configuration of the high-frequency front-end module 1 will be described.

As illustrated in FIG. 1, the high-frequency front-end module 1 includes the common terminals 110 and 120, transmission amplifier circuits 61 and 62, reception amplifier circuits 71 and 72, transmission filters 11T and 12T, reception filters 11R and 12R, and a band elimination filter 50.

The common terminal 110 is connected to the antenna element 21, an output end of the transmission filter 11T, and an input end of the reception filter 11R. Further, the common terminal 120 is connected to the antenna element 22, an output end of the transmission filter 12T, and an input end of the reception filter 12R.

The transmission amplifier circuit 61 is a first transmission amplifier circuit that amplifies a high-frequency signal, and is a power amplifier circuit having a good gain in a predetermined frequency band including the band A, which will be described later. In addition, the transmission amplifier circuit 62 is a second transmission amplifier circuit that amplifies a high-frequency signal, and is a power amplifier circuit having a good gain in a predetermined frequency band including the band B, which will be described later.

The reception amplifier circuit 71 is a first reception amplifier circuit that amplifies a high-frequency signal, and is a low-noise amplifier circuit having a good gain and a noise figure in a predetermined frequency band including the band A, which will be described later. Further, the reception amplifier circuit 72 is a second reception amplifier circuit that amplifies a high-frequency signal, and is a low-noise amplifier circuit having a good gain and a noise figure in a predetermined frequency band including the band B, which will be described later.

The transmission filter 11T is a first transmission filter that includes an output terminal connected to the common terminal 110, is disposed in a signal path 31 connecting the transmission amplifier circuit 61 and the common terminal 110, inputs a first transmission signal included in the high-frequency signal output from the transmission amplifier circuit 61, and has a transmission band (A-Tx) of the band A (first communication band) as a pass band. In addition, the transmission filter 12T is a transmission filter that includes an output terminal connected to the common terminal 120, is disposed in a signal path 32 connecting the transmission amplifier circuit 62 and the common terminal 120, inputs a second transmission signal included in the high-frequency signal output from the transmission amplifier circuit 62, and has a transmission band (B-Tx) of the band B (second communication band) as a pass band.

The reception filter 11R is a first reception filter that includes an input terminal connected to the common terminal 110, is disposed in a signal path 41 connecting the reception amplifier circuit 71 and the common terminal 110, and has a reception band (A-Rx) of the band A (the predetermined communication band or the first communication band) as a pass band. Here, a frequency of an intermodulation distortion generated by the first transmission signal output from the transmission amplifier circuit 61 and the second transmission signal output from the transmission amplifier circuit 62 overlaps a frequency of the pass band of the reception filter 11R. In addition, the reception filter 12R is a reception filter that includes an input terminal connected to the common terminal 120, is disposed in a signal path 42 connecting the reception amplifier circuit 72 and the common terminal 120, and has a reception band (B-Rx) of the band B (second communication band) as a pass band.

The transmission filter 11T and the reception filter 11R configure a duplexer having the band A as a pass band, and the transmission filter 12T and the reception filter 12R configure a duplexer having the band B as a pass band.

In the above configuration, the high-frequency front-end module 1 according to the present embodiment can simultaneously perform transmission of a transmission signal of the communication band A, transmission of a transmission signal of the band B, and reception of a reception signal of the band A.

However, in a case where the transmission of the transmission signal of the communication band A, the transmission of the transmission signal of the band B, and the reception of the reception signal of the band A are simultaneously performed, it is assumed that the second transmission signal output from the transmission amplifier circuit 61 is superimposed on the first transmission signal output from the transmission amplifier circuit 62 in the signal path 31. In particular, in a case where the signal paths 31 and 32 are arranged close to each other, the second transmission signal propagating through the signal path 31 increases. For example, in a case where the high-frequency front-end module is formed into one module in which the transmission amplifier circuit 61 and the transmission amplifier circuit 62 are disposed in the same substrate, the second transmission signal superimposed on the first transmission signal increases in the signal path 31.

When the high-frequency signal superimposed as described above is input to the transmission filter 11T, the intermodulation distortion of the first transmission signal and the second transmission signal generated due to a non-linear operation of the transmission filter 11T. In a case where the frequency of the intermodulation distortion overlaps a frequency of the pass band of the reception filter 11R, the intermodulation distortion passes through the reception filter 11R via the common terminal 110, and propagates through the reception path 41. Since the reception signal propagating through the reception path 41 is weaker than the transmission signal, when the above intermodulation distortion is superimposed on the reception signal, which causes reception sensitivity in the reception band of the band A to deteriorate.

Whereas, the high-frequency front-end module 1 according to the present embodiment is capable of simultaneously performing transmission of the transmission signal of the band A, transmission of the transmission signal of the band B, and reception of the reception signal of the band A, and includes the common terminal 110, the transmission amplifier circuits 61 and 62 that amplify the high-frequency signal, the transmission filter 11T that includes the output terminal connected to the common terminal 110, inputs the first transmission signal output from the transmission amplifier circuit 61, and has the transmission band of the band A as the pass band, the reception filter 11R that includes the input terminal connected to the common terminal 110, in which the frequency of the intermodulation distortion generated by the first transmission signal and the second transmission signal output from the transmission amplifier circuit 62 partially overlaps a frequency of the pass band, and the band elimination filter 50 that is disposed in the signal path 31 connecting the output terminal of the transmission amplifier circuit 61 and the transmission filter 11T, has the transmission band of the band A as the pass band, and has the transmission band of the band B as an attenuation band. That is, the high-frequency front-end module 1 includes the band elimination filter 50 that is disposed on the signal path 31 between the output terminal of the transmission amplifier circuit 61 and the transmission filter 11T, has the transmission band of the band A (first communication band) as the pass band, and has the transmission band of the band B (second communication band) as the attenuation band.

According to the arrangement of the band elimination filter 50, it is possible to suppress the second transmission signal in the high-frequency signal that is input to the transmission filter 11T. As such, it is possible to suppress the intermodulation distortion generated due to the non-linear operation of the transmission filter 11T. Therefore, it is possible to suppress the deterioration of the reception sensitivity to the high-frequency reception signal of the band A passing through the reception filter 11R. Further, since the band elimination filter 50 is disposed on the signal path 31 between the output terminal of the transmission amplifier circuit 61 and the transmission filter 11T, the first transmission signal from the transmission amplifier circuit 61 toward the transmission filter 11T passes through the band elimination filter 50 without necessarily omission. Therefore, it is possible to suppress the intermodulation distortion generated due to the non-linear operation of the transmission filter 11T with high efficiency.

In addition, according to the above configuration, it is possible to provide the communication device 5 in which the deterioration of the reception sensitivity due to the intermodulation distortion in a case where the above multiple uplink is performed is suppressed.

Note that, the band elimination filter 50 is a filter having a plurality of attenuation poles in the band B (second communication band) transmission band, for example, but may be a notch filter having one attenuation pole in the transmission band. Further, the band elimination filter 50 is a filter having a band other than the above transmission band as a pass band, but it is only necessary to include at least the transmission band of the band A (first communication band) as the pass band.

Further, in the high-frequency front-end module 1 according to Embodiment 1, the above intermodulation distortion may pass through the reception filter 11R having the reception band of the same band A as the pass band due to the non-linear operation of the transmission filter 11T having the transmission band of the band A as the pass band. In this case, even in a case where the reception filter 11R among the filters connected to the common terminal 110 is arranged closest to the transmission filter 11T, it is possible to suppress an inflow of components of the above intermodulation distortion, and thus it is possible to effectively suppress the suppression of the reception sensitivity of the high-frequency front-end module 1.

Note that in the present embodiment, circuit configuration is exemplified in which the signal path 31 corresponding to the band A is provided, and the signal path 32 corresponding to the band B is provided, however, for example, a circuit configuration may be employed in which a signal path corresponding to another band other than the band B is provided between the transmission amplifier circuit 62 and the common terminal 120. Such a circuit configuration is described in Modification 1 of Embodiment 2.

Additionally, in the high-frequency front-end module 1 according to the present embodiment, the reception filter 12R, the transmission filter 12T, the reception amplifier circuits 71 and 72 are optional components.

Further, in the present embodiment, the antenna circuit 2 includes two antenna elements 21 and 22, however, the antenna elements configuring the antenna circuit 2 may be one antenna element. That is, the common terminal 110 and the common terminal 120 may be connected to the same one antenna element. Additionally, in order to achieve this, a configuration may be provided in which the common terminals 110 and 120 are combined as one common terminal in the high-frequency front-end module 1.

Further, as for the transmission filters 11T and 12T, the reception filters 11R and 12R, and the band elimination filter 50, a surface acoustic wave filter, an acoustic wave filter using a bulk acoustic wave (BAW), an LC resonance filter, a dielectric filter, and the like are exemplified, but materials and structures of these filters are not limited.

Further, the transmission amplifier circuits 61 and 62, and the reception amplifier circuits 71 and 72 are configured by, for example, a CMOS, or a field-effect transistor (FET), a hetero bipolar transistor (HBT), and the like, which are made of a material, such as GaAs.

The high-frequency front-end module 1 according to the present embodiment has, for example, a configuration in which each filter and each amplifier circuit having the configuration as described above are mounted on a mounting substrate.

Here, in the high-frequency front-end module 1, the transmission amplifier circuits 61 and 62 may be formed in the same substrate or in the same package. According to this, a configuration is provided in which the second transmission signal easily propagates to the signal path 31. However, even in this configuration, since the band elimination filter 50 is disposed on the signal path 31, it is possible to suppress the second transmission signal in the high-frequency transmission signal input to the transmission filter 11T. Therefore, since the transmission amplifier circuits 61 and 62 are formed on the same substrate, the high-frequency front-end module 1 can be miniaturized, and the deterioration of the reception sensitivity to the high-frequency reception signal passing through the reception filter 11R can be suppressed.

1.2 Configuration of High-Frequency Front-End Module 1A and Communication Device 5A According to Modification 1

Figure 2:
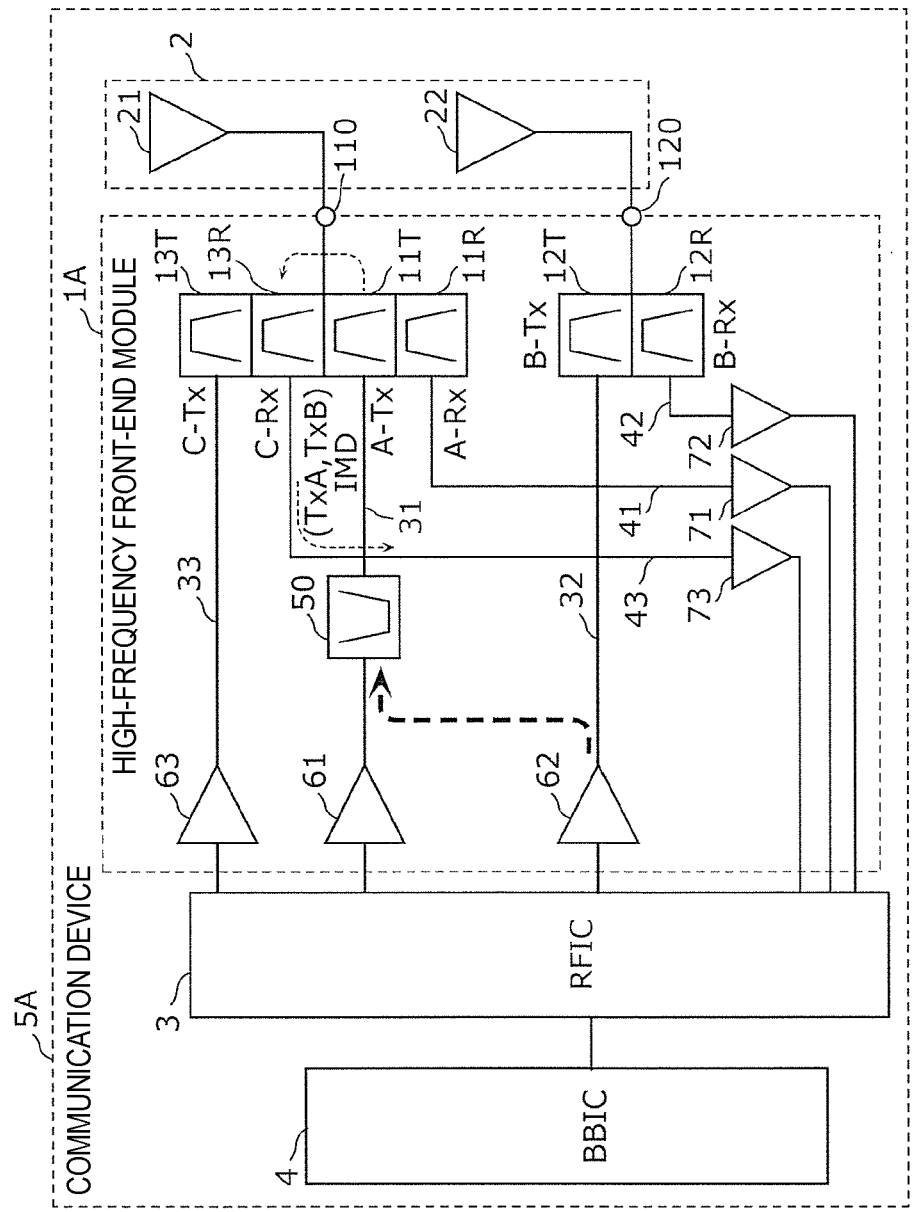
FIG. 2 is a circuit configuration diagram of a communication device according to Modification 1 of Embodiment 1.

FIG. 2 is a circuit configuration diagram of a communication device 5A according to Modification 1 of Embodiment 1. As illustrated in the figure, the communication device 5A includes a high-frequency front-end module 1A, the antenna circuit 2, the RFIC 3, and the BBIC 4. The communication device 5A illustrated in the figure differs from the communication device 5 according to Embodiment 1 only in a circuit configuration of the high-frequency front-end module 1A.

The high-frequency front-end module 1A includes the common terminals 110 and 120, the transmission amplifier circuits 61 and 62 and a transmission amplifier circuit 63, the reception amplifier circuits 71 and 72 and a reception amplifier circuit 73, the transmission filters 11T and 12T and a transmission filter 13T, the reception filters 11R and 12R and a reception filter 13R, and the band elimination filter 50. The high-frequency front end module 1A according to the present modification differs from the high-frequency front-end module 1 according to Embodiment 1 in that the transmission amplifier circuit 63, the reception amplifier circuit 73, the transmission filter 13T, and the reception filter 13R are added. Hereinafter, for the high-frequency front-end module 1A according to the present modification, the description on the same points as those of the high-frequency front-end module 1 according to Embodiment 1 will be omitted, and the description will be made mainly on different points.

The transmission amplifier circuit 63 is a power amplifier circuit having a good gain in a predetermined frequency band including a band C, which will be described later. The reception amplifier circuit 73 is a low-noise amplifier circuit having a good gain and a noise figure in a predetermined frequency band including the band C.

The transmission filter 13T is a filter that includes an output terminal connected to the common terminal 110, is disposed in the signal path 33 connecting the transmission amplifier circuit 63 and the common terminal 110, inputs a high-frequency transmission signal output from the transmission amplifier circuit 63, and has a transmission band (C-Tx) of the band C as a pass band.

The reception filter 13R is a first reception filter that includes an input terminal connected to the common terminal 110, is disposed in a signal path 43 connecting the reception amplifier circuit 73 and the common terminal 110, and has a reception band (C-Rx) of the band C (a predetermined communication band) as a pass band. Here, the frequency of the intermodulation distortion generated by the first transmission signal output from the transmission amplifier circuit 61 and the second transmission signal output from the transmission amplifier circuit 62 overlaps a frequency of the pass band of the reception filter 13R. The reception filter 13R is a filter having the reception band of the band C, which is different from the band A, as the pass band.

The transmission filter 11T and the reception filter 11R configure a duplexer having the band A as a pass band, and the transmission filter 13T and the reception filter 13R configure a duplexer having the band C as a pass band. Further, the transmission filter 11T, the reception filter 11R, the transmission filter 13T, and the reception filter 13R are all connected to the common terminal 110, and configure a quadplexer that allows the high-frequency signals of the band A and the band C to pass therethrough.

According to the above configuration, the high-frequency front-end module 1A according to the present modification can simultaneously perform transmission of the transmission signal of the band A, transmission of the transmission signal of the band B, and reception of the reception signal of the band C.

However, in a case where the transmission of the transmission signal of the band A, the transmission of the transmission signal of the band B, and the reception of the reception signal of the band C described above are simultaneously performed, it is assumed that the second transmission signal output from the transmission amplifier circuit 62 is superimposed on the first transmission signal output from the transmission amplifier circuit 61 in the signal path 31. When the above superimposed high-frequency signal is input to the transmission filter 11T, the intermodulation distortion of the first transmission signal and the second transmission signal is generated due to the non-linear operation of the transmission filter 11T. In a case where the frequency of the intermodulation distortion overlaps the frequency of the pass band of the reception filter 13R, there is concern that the intermodulation distortion passes through the reception filter 13R via the common terminal 110 to deteriorate the reception sensitivity in the reception band of the band C.

Whereas, the high-frequency front-end module 1A according to the present modification includes, as similar to Embodiment 1, the band elimination filter 50 that is disposed on the signal path 31 between the output terminal of the transmission amplifier circuit 61 and the transmission filter 11T, has the transmission band of the band A (the first communication band) as the pass band, and has the transmission band of the band B (the second communication band) as the attenuation band.

As described above, by arranging the band elimination filter 50, it is possible to suppress the second transmission signal in the high-frequency signal input to the transmission filter 11T. As such, it is possible to suppress the intermodulation distortion generated due to the non-linear operation of the transmission filter 11T. Therefore, it is possible to suppress the deterioration of the reception sensitivity to the high-frequency reception signal of the band C passing through the reception filter 13R.

That is, in the high-frequency front-end module 1 according to Embodiment 1, it is possible to suppress the deterioration of the reception sensitivity of the reception band of the same band A, which is generated due to the non-linear operation of the transmission filter 11T having the transmission band of the band A as the pass band, whereas in the high-frequency front-end module 1A according to the present modification, it is possible to suppress the deterioration of the reception sensitivity of the reception band of the different band C, which is generated due to the non-linear operation of the transmission filter 11T having the transmission band of the band A as the pass band.

1.3 Configuration of High-Frequency Front-End Module 1B According to Modification 2

Figure 3:
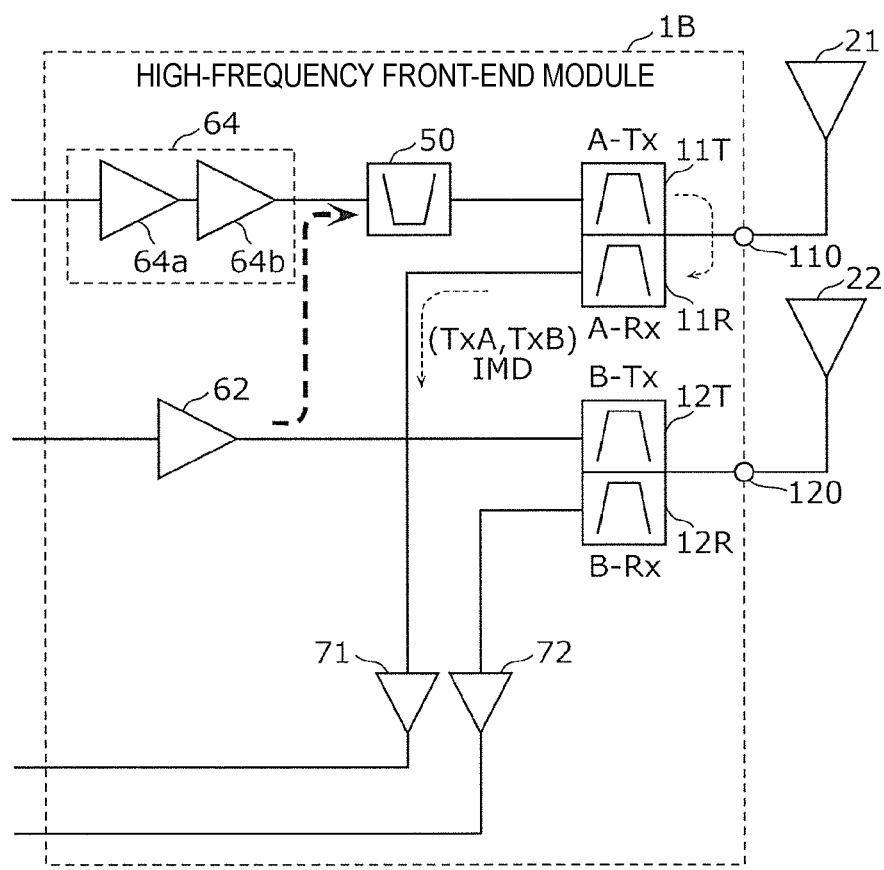
FIG. 3 is a circuit configuration diagram of a high-frequency front-end module according to Modification 2 of Embodiment 1.

FIG. 3 is a circuit configuration diagram of a high-frequency front-end module 1B according to Modification 2 of Embodiment 1. As illustrated in the figure, the high-frequency front-end module 1B includes common terminals 110 and 120, a transmission amplifier circuit 64 and the transmission amplifier circuit 62, the reception amplifier circuits 71 and 72, the transmission filters 11T and 12T, the reception filters 11R and 12R, and the band elimination filter 50. The high-frequency front-end module 1B according to the present modification differs from the high-frequency front-end module 1 according to Embodiment 1 in that the transmission amplifier circuit 61 is replaced with the transmission amplifier circuit 64. Hereinafter, for the high-frequency front-end module 1B according to the present modification, the description on the same points as those of the high-frequency front-end module 1 according to Embodiment 1 will be omitted, and the description will be made mainly on different points.

The transmission amplifier circuit 64 is the first transmission amplifier circuit that amplifies the high-frequency signal, and is a power amplifier circuit having a good gain in a predetermined frequency band including the band A. The transmission amplifier circuit 64 includes amplifiers 64a and 64b connected in cascading connection (in series connection) with each other between an input terminal and an output terminal of the transmission amplifier circuit 64. The amplifier 64b of the amplifiers 64a and 64b is an amplifier disposed at the last stage of the transmission amplifier circuit 64, and is connected to the output terminal of the transmission amplifier circuit 64.

In a transmission amplifier circuit in which a plurality of amplifiers is connected in cascading connection, it is assumed to dispose a band elimination filter for attenuating the second transmission signal at a stage of a small signal level in order to efficiently improve the noise characteristics. That is, it is assumed that the above band elimination filter is disposed between the amplifier 64a in the previous stage and the amplifier 64b in the subsequent stage. However, with this configuration, the superimposed component of the second transmission signal at the output time from the amplifier 64a in the previous stage can be attenuated by the above band elimination filter, but the superimposed component of the second transmission signal at the output time from the amplifier 64b in the subsequent stage cannot be attenuated by the above-described band elimination filter.

Whereas, since the band elimination filter 50 according to the present modification is disposed between the amplifier 64b at the last stage of the transmission amplifier circuit 64 and the transmission filter 11T, the superimposed component of the second transmission signal at the time of output from all the amplifiers can be attenuated without necessarily omission, and the intermodulation distortion generated due to the non-linear operation of the transmission filter 11T can be suppressed with high efficiency.

Embodiment 2

In the present embodiment, a high-frequency front-end module having a configuration in which a switch for band selection is additionally disposed with respect to the high-frequency front-end module according to Embodiment 1 is described.

2.1 Configuration of High-Frequency Front-End Module 1C

Figure 4:
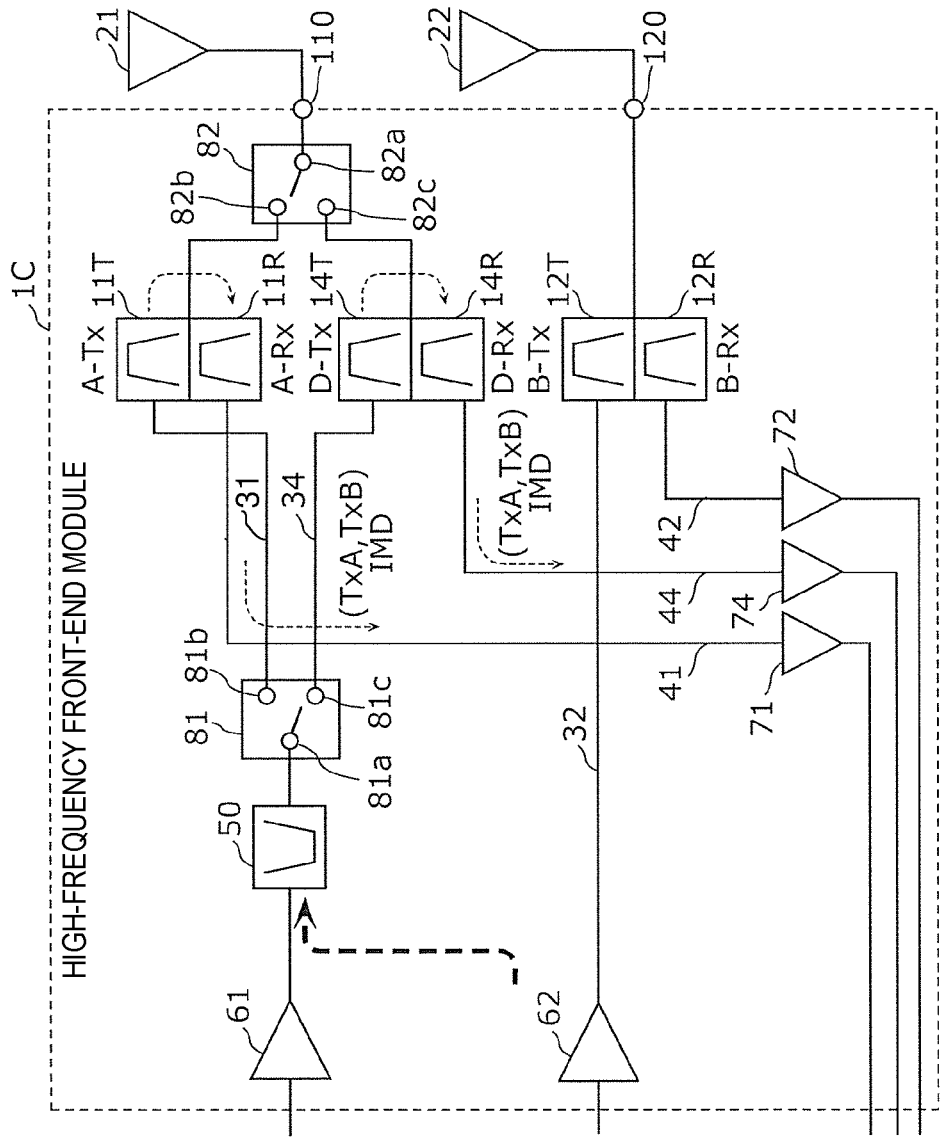
FIG. 4 is a circuit configuration diagram of a high-frequency front end module according to Embodiment 2.

FIG. 4 is a circuit configuration diagram of a high-frequency front-end module 1C according to Embodiment 2. As illustrated in the figure, the high-frequency front-end module 1C includes the common terminals 110 and 120, the transmission amplifier circuits 61 and 62, the reception amplifier circuits 71 and 72 and a reception amplifier circuit 74, the transmission filters 11T and 12T and a transmission filter 14T, the reception filters 11R and 12R and a reception filter 14R, the band elimination filter 50, and switches 81 and 82. The high-frequency front-end module 1C according to the present embodiment is different from the high-frequency front-end module 1 according to Embodiment 1 in that the reception amplifier circuit 74, the transmission filter 14T, the reception filter 14R, and the switches 81 and 82 are added. Hereinafter, for the high-frequency front-end module 1C according to the present embodiment, description on the same points as those of the high-frequency front-end module 1 according to Embodiment 1 will be omitted, and the description will be made mainly on different points.

The reception amplifier circuit 74 is a low-noise amplifier circuit having a good gain and a noise figure in a predetermined frequency band including a band D, which will be described later.

The transmission filter 14T is a second transmission filter that includes an output terminal connected to the common terminal 110 via the switch 82, is disposed in a signal path 34 connecting the transmission amplifier circuit 61 and the common terminal 110, inputs the transmission signal output from the transmission amplifier circuit 61, and has a transmission band (D-Tx) of the band D (third communication band) as a pass band. Note that the band D is different from the band A and the band B.

The reception filter 14R is a filter that includes an input terminal connected to the common terminal 110 via the switch 82, is disposed in a signal path 44 connecting the reception amplifier circuit 74 and the common terminal 110, and has a reception band (D-Rx) of the band D (third communication band) as a pass band. Here, the frequency of the intermodulation distortion generated by the transmission signal output from the transmission amplifier circuit 61 and the second transmission signal output from the transmission amplifier circuit 62 partially overlaps a frequency of the pass band of the reception filter 14R.

The transmission filter 11T and the reception filter 11R configure a duplexer 11 having the band A as a pass band, and the transmission filter 14T and the reception filter 14R configure a duplexer 14 having the band D as a pass band.

The switch 81 is a first switch disposed between the band elimination filter 50 and the transmission filter 11T and between the band elimination filter 50 and the transmission filter 14T. The switch 81 includes a common terminal 81a, selection terminals 81b and 81c, the common terminal 81a being connected to the band elimination filter 50, the selection terminal 81b being connected to the transmission filter 11T, the selection terminal 81c being connected to the transmission filter 14T. Accordingly, the switch 81 switches between a connection between the band elimination filter 50 and the transmission filter 11T and a connection between the band elimination filter 50 and the transmission filter 14T.

The switch 82 is a band selection switch disposed between the antenna element 21 and the duplexer 11 and between the antenna element 21 and the duplexer 14. The switch 82 includes a common terminal 82a, selection terminals 82b and 82c, the common terminal 82a being connected to the antenna element 21 via the common terminal 110, the selection terminal 82b being connected to the duplexer 11, the selection terminal 82c being connected to the duplexer 14. Accordingly, the switch 82 switches between a connection between the antenna element 21 and the duplexer 11 and a connection between the antenna element 21 and the duplexer 14. Note that the switch 82 does not need to be provided, and is an optional constituent element.

According to the above configuration, it is possible to simultaneously perform transmission of the transmission signal of the band A, transmission of the transmission signal of the band B, and reception of the reception signal of the band A. In addition, it is possible to simultaneously perform transmission of the transmission signal of the band D, the transmission of the transmission signal of the band B, and reception of the reception signal of the band D.

Further, the switch 81 for switching between the band A and the band D may generate the intermodulation distortion due to the non-linear operation, however, since the band elimination filter 50 is disposed in the preceding stage of the switch 81, it is possible to suppress not only the occurrence of the intermodulation distortion in the transmission filter 11T and the transmission filter 14T but also the occurrence of the intermodulation distortion in the switch 81.

Therefore, according to the high-frequency front-end module 1C according to the present embodiment, it is possible to suppress both the deterioration in the reception sensitivity to the high-frequency reception signal of the band A passing through the reception filter 11R and the deterioration in the reception sensitivity to the high-frequency reception signal of the band D passing through the reception filter 14R.

2.2 Configuration of High-Frequency Front-End Module 1D According to Modification 1

Figure 5:
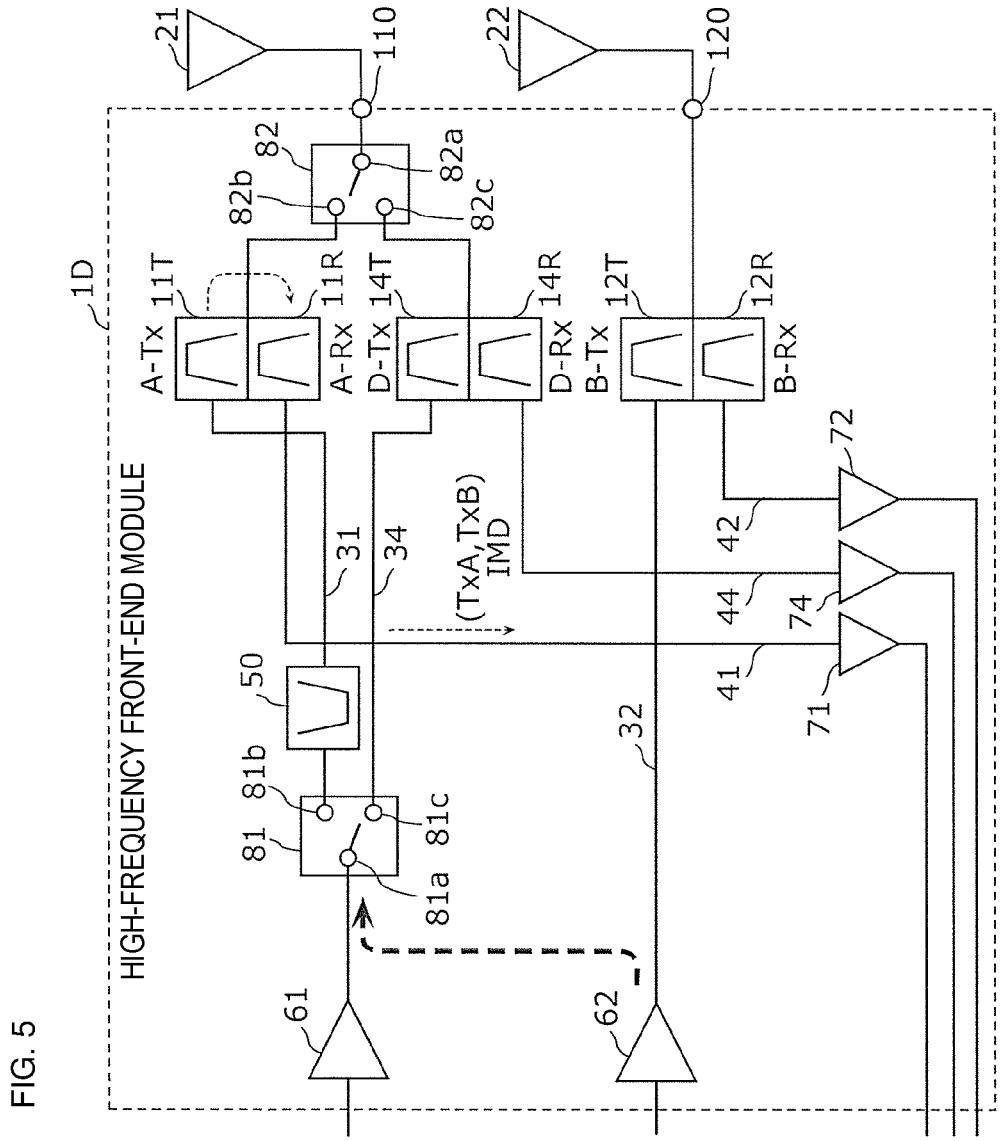
FIG. 5 is a circuit configuration diagram of a high-frequency front-end module according to Modification 1 of Embodiment 2.

FIG. 5 is a circuit configuration diagram of a high-frequency front-end module 1D according to Modification 1 of Embodiment 2. As illustrated in the figure, the high-frequency front-end module 1D includes the common terminals 110 and 120, the transmission amplifier circuits 61 and 62, the reception amplifier circuits 71, 72, and 74, transmission filters 11T, 12T, and 14T, the reception filters 11R, 12R, and 14R, the band elimination filter 50, and the switches 81 and 82. The high-frequency front-end module 1D according to the present modification differs from the high-frequency front end module 1C according to Embodiment 2 in that the arrangement position of the band elimination filter 50 is different therefrom. Hereinafter, for the high-frequency front-end module 1D according to the present modification, the description on the same points as those of the high-frequency front-end module 1C according to Embodiment 2 will be omitted, the description will be made mainly on different points.

The switch 81 is a second switch disposed between the transmission amplifier circuit 61 and the band elimination filter 50 and between the transmission amplifier circuit 61 and the transmission filter 14T. The switch 81 includes the common terminal 81a, the selection terminals 81b and 81c, the common terminal 81a being connected to the transmission amplifier circuit 61, the selection terminal 81b being connected to the band elimination filter 50, the selection terminal 81c being connected to the transmission filter 14T. Accordingly, the switch 81 switches between a connection of the transmission amplifier circuit 61 and the band elimination filter 50 and the transmission filter 11T, and a connection between the transmission amplifier circuit 61 and the transmission filter 14T.

That is, the band elimination filter 50 is disposed in the signal path 31 connecting the selection terminal 81b of the switch 81 and the transmission filter 11T.

Accordingly, it is possible to switch between (1) simultaneous execution of the transmission of the transmission signal of the band A (first communication band), the transmission of the transmission signal of the band B (second communication band), and the reception of the reception signal of the band A, and (2) simultaneous execution of the transmission of the transmission signal of the band D (third communication band), the transmission of the transmission signal of the band B, and the reception of the reception signal of the band D.

Further, since the band elimination filter 50 is disposed between the subsequent stage of the switch 81 and the transmission filter 11T, and the band elimination filter 50 is not disposed between the subsequent stage of the switch 81 and the transmission filter 14T, it is possible to suppress the occurrence of the intermodulation distortion in the transmission filter 11T while suppressing a propagation loss of the high-frequency transmission signal passing through the transmission filter 14T from the transmission amplifier circuit 61.

2.3 Configuration of High-Frequency Front-End Module 1E According to Modification 2

Figure 6:
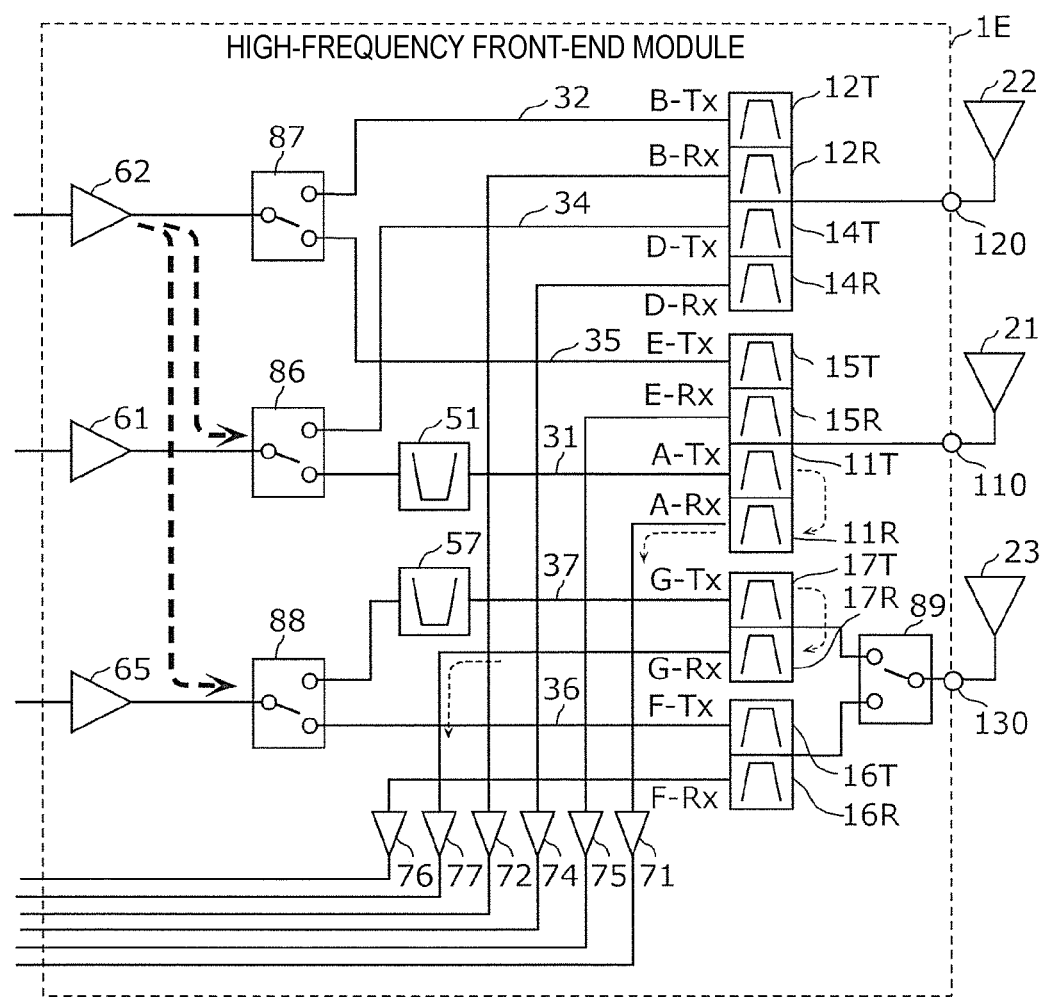
FIG. 6 is a circuit configuration diagram of a high-frequency front-end module according to Modification 2 of Embodiment 2.

FIG. 6 is a circuit configuration diagram of a high-frequency front-end module 1E according to Modification 2 of Embodiment 2. As illustrated in the figure, the high-frequency front-end module 1E includes the common terminals 110 and 120 and a common terminal 130, the transmission amplifier circuits 61 and 62 and a transmission amplifier circuit 65, the reception amplifier circuits 71, 72, and 74 and reception amplifier circuits 75, 76 and 77, the transmission filters 11T, 12T, and 14T and transmission filters 15T, 16T, and 17T, the reception filters 11R, 12R, and 14R and reception filters 15R, 16R, and 17R, the band elimination filter 51 and a band elimination filter 57, and switches 86, 87, 88, and 89. The high-frequency front-end module 1E according to the present modification differs from the high-frequency front-end module 1C according Embodiment 2 in that six signal paths connected to three transmission amplifier circuits are provided. Hereinafter, for the high-frequency front-end module 1E according to the present modification, the description on the same points as those of the high-frequency front-end module 1C according to Embodiment 2 will be omitted, and the description will be made mainly on different points.

The common terminal 110 is connected to the antenna element 21, the output end of the transmission filter 11T, the input end of the reception filter 11R, an output end of the transmission filter 15T, and an input end of the reception filter 15R. In addition, the common terminal 120 is connected to the antenna element 22, the output end of the transmission filter 12T, the input end of the reception filter 12R, an output end of the transmission filter 14T, and an input end of the reception filter 14R. The common terminal 130 is connected to a common terminal of the antenna element 23 and the switch 89.

The transmission amplifier circuit 65 is a power amplifier circuit that amplifies a high-frequency signal and has a good gain in a predetermined frequency band including a band G and a band F, which will be described later.

The reception amplifier circuit 75 is a low-noise amplifier circuit that amplifies a high-frequency signal and has a good gain and a noise figure in a predetermined frequency band including a band E, which will be described later. In addition, the reception amplifier circuit 76 is a low-noise amplifier circuit that amplifies a high-frequency signal and has a good gain and a noise figure in a predetermined frequency band including the band F, which will be described later. Further, the reception amplifier circuit 77 is a low-noise amplifier circuit that amplifies a high-frequency signal and has a good gain and a noise figure in a predetermined frequency band including the band G, which will be described later.

The transmission filter 15T is a transmission filter that includes an output terminal connected to the common terminal 110, is disposed in a signal path 35 connecting the transmission amplifier circuit 62 and the common terminal 110, inputs a high-frequency transmission signal output from the transmission amplifier circuit 62, and has a transmission band (E-Tx) of the band E as a pass band. In addition, the transmission filter 16T is a transmission filter that includes an output terminal connected to the common terminal 130 via the switch 89, is disposed in a signal path 36 connecting the transmission amplifier circuit 65 and the common terminal 130, inputs the high-frequency transmission signal output from the transmission amplifier circuit 65, and has a transmission band (F-Tx) of the band F as a pass band. Further, the transmission filter 17T is a transmission filter that includes an output terminal connected to the common terminal 130 via the switch 89, is disposed in a signal path 37 connecting the transmission amplifier circuit 65 and the common terminal 130, inputs the high-frequency transmission signal output from the transmission amplifier circuit 65, and has a transmission band (G-Tx) of the band G as a pass band.

The reception filter 15R is a reception filter that includes an input terminal connected to the common terminal 110, is disposed in a signal path connecting the reception amplifier circuit 75 and the common terminal 110, and has a reception band (E-Rx) of the band E as a pass band. In addition, the reception filter 16R is a reception filter that includes an input terminal connected to the common terminal 130 via the switch 89, is disposed in a signal path connecting the reception amplifier circuit 76 and the common terminal 130, and has a reception band (F-Rx) of the band F as a pass band. Further, the reception filter 17R is a reception filter that includes an input terminal connected to the common terminal 130 via the switch 89, is disposed in a signal path connecting the reception amplifier circuit 77 and the common terminal 130, and has a reception band (G-Rx) of the band G as a pass band. Here, the frequency of the intermodulation distortion generated by the first transmission signal output from the transmission amplifier circuit 61 and the second transmission signal output from the transmission amplifier circuit 62 overlaps a frequency of the pass band of the reception filter 11R. Further, the frequency of the intermodulation distortion generated by the transmission signal output from the transmission amplifier circuit 65 and the second transmission signal output from the transmission amplifier circuit 62 overlaps a frequency of the pass band of the reception filter 17R.

The band elimination filter 51 is a filter that is disposed in the signal path 31 between a selection terminal of the switch 86 and the transmission filter 11T, and has the transmission band of the band B (second communication band) as an attenuation band. The band elimination filter 57 is a filter that is disposed in the signal path 37 between a selection terminal of the switch 88 and the transmission filter 17T, and has the transmission band of the band E as an attenuation band.

The switch 86 includes a common terminal connected to the transmission amplifier circuit 61, one selection terminal connected to the band elimination filter 51, and another selection terminal connected to the transmission filter 14T. The switch 87 includes a common terminal connected to the transmission amplifier circuit 62, one selection terminal connected to the transmission filter 12T, and another selection terminal connected to the transmission filter 15T. The switch 88 includes a common terminal connected to the transmission amplifier circuit 65, one selection terminal connected to the band elimination filter 57, and another selection terminal connected to the transmission filter 16T. The switch 89 includes a common terminal connected to the antenna element 23 via the common terminal 130, one selection terminal connected to the transmission filter 17T and the reception filter 17R that configure the duplexer, and another selection terminal connected to the transmission filter 16T and the reception filter 16R that configure the duplexer.

According to the above configuration, the high-frequency front-end module 1E according to the present modification can execute CA that simultaneously uses at least two of one of the bands A and D, one of the bands B and E, and one of the bands G and F. Among them, the high-frequency front-end module 1E is capable of switching between (1) the simultaneous execution of the transmission of the transmission signal of the band A, the transmission of the transmission signal of the band B, and the reception of the reception signal of the band A, and (2) simultaneous execution of transmission of a transmission signal of the band G, transmission of a transmission signal of the band E, and reception of a reception signal of the band G.

However, in a case where the above (1) is performed, it is assumed that the second transmission signal of the band B output from the transmission amplifier circuit 62 is superimposed on the first transmission signal output from the transmission amplifier circuit 61 in the signal path 31. When the above superimposed high-frequency signal is input to the transmission filter 11T, the intermodulation distortion of the first transmission signal and the second transmission signal is generated due to the non-linear operation of the transmission filter 11T. In a case where a frequency of the intermodulation distortion overlaps the frequency of the pass band of the reception filter 11R, there is concern that the intermodulation distortion passes through the reception filter 11R via the common terminal 110 to deteriorate the reception sensitivity in the reception band of the band A.

In addition, in a case where the above (2) is performed, it is assumed that the high-frequency transmission signal of the band E output from the transmission amplifier circuit 62 is superimposed on the high-frequency transmission signal output from the transmission amplifier circuit 65 in the signal path 37. When the above superimposed high-frequency signal is input to the transmission filter 17T, intermodulation distortion by the superimposed high-frequency transmission signal occurs due to the non-linear operation of the transmission filter 17T. In a case where a frequency of the intermodulation distortion overlaps a frequency of the passband of the reception filter 17R, there is concern that the intermodulation distortion passes through the reception filter 17R to deteriorate the reception sensitivity in the reception band of the band G.

Whereas, since the high-frequency front-end module 1E according to the present modification is provided with the band elimination filters 51 and 57, the high-frequency transmission signal of the band B in the high-frequency signal input to the transmission filter 11T can be suppressed, and the high-frequency transmission signal of the band E in the high-frequency signal input to the transmission filter 17T can be suppressed. As such, it is possible to suppress the intermodulation distortion generated due to the non-linear operation of the transmission filter 11T, and it is possible to suppress the intermodulation distortion generated due to the non-linear operation of the transmission filter 17T. Therefore, it is possible to suppress the deterioration of the reception sensitivity to the high-frequency reception signal of the band A passing through the reception filter 11R, and it is possible to suppress the degradation of the reception sensitivity to the high-frequency reception signal of the band G passing through the reception filter 17R.

Embodiment 3

In the present embodiment, a high-frequency front-end module capable of switching between a CA that performs multiple uplink and a non-CA that performs transmission, reception, or transmission/reception of a single band is described.

Figure 7:
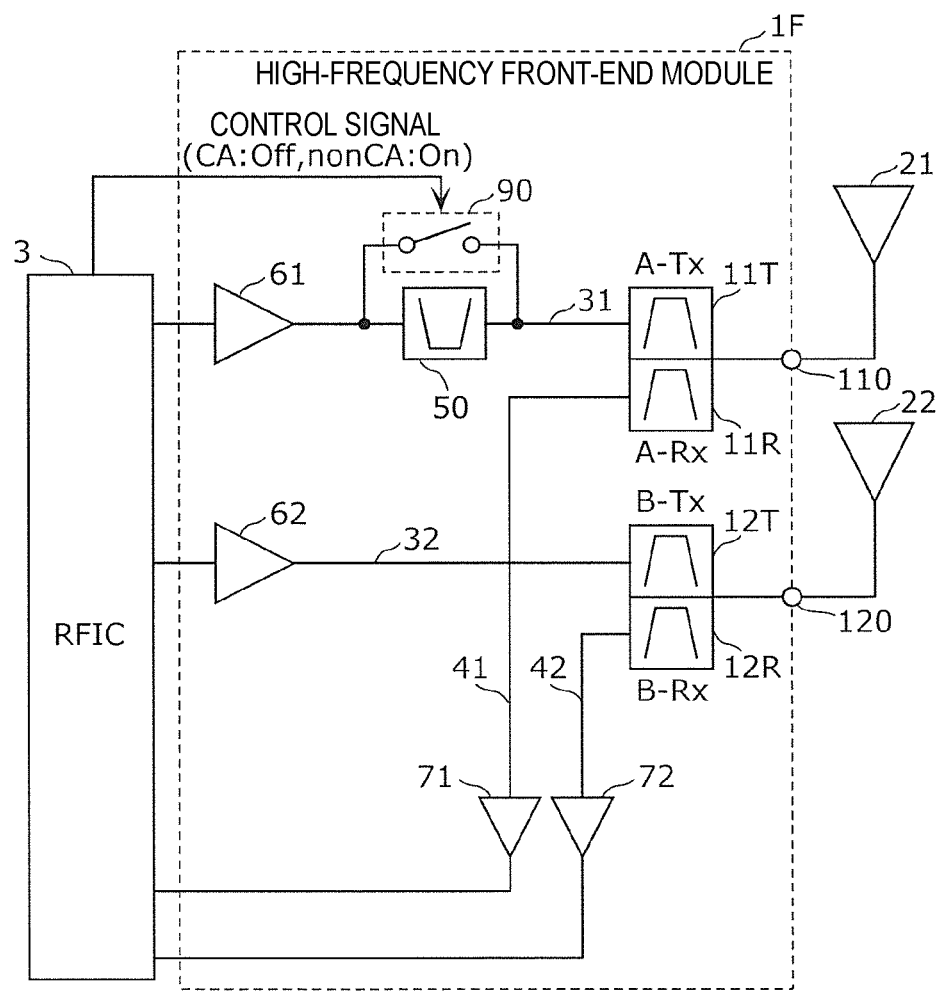
FIG. 7 is a circuit configuration diagram of a high-frequency front-end module according to Embodiment 3.

FIG. 7 is a circuit configuration diagram of a high-frequency front-end module 1F according to Embodiment 3. As illustrated in the figure, the high-frequency front-end module 1F includes the common terminals 110 and 120, the transmission amplifier circuits 61 and 62, the reception amplifier circuits 71 and 72, the transmission filters 11T and 12T, the reception filters 11R and 12R, the band elimination filter 50, and a switch 90. The high-frequency front-end module 1F according to the present embodiment is different from the high-frequency front-end module 1 according to Embodiment 1 in that the switch 90 is added to the signal path 31. Hereinafter, for the high-frequency front-end module 1F according to the present embodiment, the description on the same points as those of the high-frequency front-end module 1 according to Embodiment 1 will be omitted, and the description will be made mainly on different points.

The switch 90 is a third switch connected to the input terminal and the output terminal of the band elimination filter 50 disposed on the signal path 31. That is, the switch 90 is connected in parallel to the band elimination filter 50. Accordingly, the switch 90 switches between a path passing through the band elimination filter 50 and a path bypassing the band elimination filter 50 in the signal path 31.

Specifically, in a case where multiple uplink for simultaneously executing transmission of a transmission signal of the band A, transmission of a transmission signal of the band B, and reception of a reception signal of the band A is executed, the switch 90 is in a non-conductive state, and in a case where transmission signals of the band A among transmission signals of the band A and transmission signals of the band B are transmitted, the switch 90 is in a conductive state.

According to the high-frequency front-end module 1F according to the present embodiment, in a case where the CA is performed, the band elimination filter 50 functions to thereby suppress the intermodulation distortion generated due to the non-linear operation of the transmission filter 11T, and it is possible to suppress the deterioration of the reception sensitivity to the high-frequency reception signal passing through the reception filter 11R. On the other hand, in a case where only the transmission signal of the band A is transmitted, since the band elimination filter 50 does not function, it is possible to suppress the propagation loss of the high-frequency transmission signal that passes through the transmission filter 11T from the transmission amplifier circuit 61.

Other Embodiments

The high-frequency front-end module and the communication device according to the embodiment have been described above with reference to Embodiments 1 to 3 and modifications thereof, but the high-frequency front-end module and the communication device according to the present disclosure are not limited to the above-described embodiments and the modifications thereof. Other embodiments realized by combining arbitrary constituent elements in the above-described embodiments and the modifications and the modifications thereof, modifications obtained by applying various changes that can be conceived by a person skilled in the art without necessarily departing from the spirit of the present disclosure with respect to the above-described embodiments and modifications thereof, and various devices incorporating the high-frequency front-end module and the communication device according to the present disclosure are also included in the present disclosure.

Note that the high-frequency front-end modules and communication devices according to Embodiments 1 to 3 are applied to, for example, a communication system, such as the 3GPP (Third Generation Partnership Project) standard. The band A, the band B, the band D, the band E, and the band G described in Embodiments 1 to 3 and the modifications thereof are applied to respective bands of the Long Term Evolution (LTE), for example.

Table 1 shows corresponding examples of the band A, band B, band D, band E, and band G described in Embodiments 1 to 3 and the modifications thereof and the respective bands of the LTE, and specific examples of the intermodulation distortion thereof.

TABLE 1

|  | BAND A BAND D BAND G (Tx1, Rx1) | BAND B BAND E (Tx2, Rx2) | Tx1 (MHz) | Tx2 (MHz) | Rx1 (MHz) | Rx2 (MHz) | INTERMODULATION DISTORTION 2Tx1-Tx2 2Tx2-Tx1 (MHz) | INTERMODULATION DISTORTION Tx1-Tx2 Tx2-Tx1 (MHz) | INTERMODULATION DISTORTION OVERLAPPING BAND |
|---|---|---|---|---|---|---|---|---|---|
| EXAMPLE 1 | B1 | B3 | 1950 | 1760 | 2140 | 1855 | 2140 | 190 | B1-Rx |
| EXAMPLE 2 | B2 | B66 | 1860 | 1780 | 1940 | 2180 | 1940 | 80 | B2-Rx |

TABLE 1-continued

| | BAND A BAND D BAND G (Tx1, Rx1) | BAND B BAND E (Tx2, Rx2) | Tx1 (MHz) | Tx2 (MHz) | Rx1 (MHz) | Rx2 (MHz) | INTERMODULATION DISTORTION 2Tx1-Tx2 2Tx2-Tx1 (MHz) | INTERMODULATION DISTORTION Tx1-Tx2 Tx2-Tx1 (MHz) | INTERMODULATION DISTORTION OVERLAPPING BAND |
|---|---|---|---|---|---|---|---|---|---|
| EXAMPLE 3 | B5 | B3 | 837.5 | 1720 | 882.5 | 1815 | 2602.5 | 882.5 | B5-Rx |
| EXAMPLE 4 | B26 | B3 | 837.5 | 1720 | 882.5 | 1815 | 2602.5 | 882.5 | B26-Rx |
| EXAMPLE 5 | B5 | B4 | 832.5 | 1710 | 877.5 | 2110 | 877.5 | 2587.5 | B5-Rx |
| EXAMPLE 6 | B28 | B21 | 703.5 | 1462 | 758.5 | 1510 | 758.5 | 2220.5 | B28-Rx |

In Table 1, for example, in Example 1, Band 1 of LTE (transmission band: 1920-1980 MHz, reception band: 2110-2170 MHz) is applied as the band A, and Band 3 of LTE (transmission band: 1710-1785 MHz, reception band: 1805-1880 MHz) is applied as the band B. At this time, a frequency ($2f_{Tx1}-f_{Tx2}$: 2140 MHz) of the intermodulation distortion of a transmission signal ($f_{Tx1}$: 1950 MHz) of Band 1 and a transmission signal ($f_{Tx2}$: 1760 MHz) of Band 3 overlaps a frequency of the reception band of Band 1. Further, in Table 1, Tx1 is a frequency of a predetermined channel in the transmission band of the band A, D, or G, and Tx2 is a frequency of a predetermined channel in the transmission band of the band B or E. Further, in Table 1, Rx1 is a frequency of a predetermined channel in the reception band of the band A, D or G, and Rx2 is a frequency of a predetermined channel in the reception band of the band B or E.

Whereas, according to the high-frequency front-end module according to Embodiments 1 to 3 and the modifications thereof, since the band elimination filter having the transmission band of Band 3 as the attenuation band is disposed on a signal path of Band 1, it is possible to suppress the intermodulation distortion ($2f_{Tx1}-f_{Tx2}$: 2140 MHz) generated in a transmission filter of Band 1. Therefore, it is possible to suppress a deterioration in the reception sensitivity of Band 1.

Note that Band 1 in the above Example 1 may be applied to the band D in the high-frequency front-end modules 1C, 1D, and 1E, and the band G in the high-frequency front-end module 1E. In addition, Band 3 in the above-described Example 1 may be applied to the band E in the high-frequency front-end module 1E.

Also, the combination of the LTE bands in Examples 2 to 6 in Table 1, similarly to the above-described Example 1 is applied to the band A, the band B, the band D, the band E, and the band G described in Embodiments 1 to 3 and the modifications thereof.

Further, as the frequency of the intermodulation distortion by two high-frequency transmission signals (Tx1 and Tx2), as shown in Table 1, typically, $2f_{Tx1}-f_{Tx2}$, $2f_{Tx2}-f_{Tx1}$, $f_{Tx1}-f_{Tx2}$, and $f_{Tx2}-f_{Tx1}$ are exemplified, but the frequency is not limited thereto, and $mf_{Tx1}\pm nf_{Tx2}$ and $mf_{Tx2}\pm nf_{Tx1}$ (m, n is a natural number) are included.

In addition, in the above-described embodiments and the modifications thereof, the configuration of CA that simultaneously uses two different communication bands has been exemplified, however, the configuration of the high-frequency front-end module and the communication device according to the present disclosure can also be applied to a configuration of CA that simultaneously uses equal to or more than three different communication bands. That is, a high-frequency front-end module or a communication device including a configuration of the high-frequency front-end module or the communication device according to the above-described embodiments and the modifications thereof, the configuration being for performing CA that simultaneously uses equal to or more than three different communication bands, is also included in the present disclosure.

Further, for example, in the high-frequency front-end module and the communication device according to the above-described embodiments and the modifications thereof, another high-frequency circuit element and a wiring may be inserted between the paths for connecting the circuit elements and the signal paths disclosed in the drawings.

In addition, in the high-frequency front-end module and the communication device according to the above-described embodiments and the modifications thereof, it is assumed that "A and B are connected" includes not only a mode in which A and B are directly connected to each other without necessarily another high-frequency circuit element, but also a mode in which A and B are indirectly connected via a passive circuit configured by an inductor, a capacitor, and the like, or a switch circuit or the like.

INDUSTRIAL APPLICABILITY

The present disclosure is widely applicable to communication equipment, such as mobile phones, as a multi-band/multi-mode front-end module that adopts a carrier aggregation scheme.

While embodiments of the disclosure have been described above, it is to be understood that variations and modifications will be apparent to those skilled in the art without necessarily departing from the scope and spirit of the disclosure. The scope of the disclosure, therefore, is to be determined solely by the following claims.

What is claimed is:

1. A high-frequency front-end module configured to simultaneously transmit a first transmission signal in a transmission band of a first communication band, transmit a second transmission signal in a transmission band of a second communication band different from the first communication band, and receive a reception signal in a reception band of a predetermined communication band, the high-frequency front-end module comprising:
a common terminal;
a first transmission amplifier circuit comprising an input terminal and an output terminal, and configured to amplify high-frequency signals input to the input terminal and to output amplified high-frequency signals from the output terminal;

a second transmission amplifier circuit configured to amplify high-frequency signals and to output amplified high-frequency signals;
a first transmission filter connected between the common terminal and the first transmission amplifier circuit, and having a pass band comprising the transmission band of the first communication band; and
a first reception filter connected to the common terminal, and having a pass band comprising the reception band of the predetermined communication band, wherein:
the pass band of the first reception filter comprises frequencies of an intermodulation distortion that is generated by the first transmission signal and that is included in one of the amplified high-frequency signals output from the first transmission amplifier circuit, and that is generated by the second transmission signal and included in one of the amplified high-frequency signals output from the second transmission amplifier circuit, and
the high-frequency front-end module further comprises a band elimination filter in a first signal path that connects the output terminal of the first transmission amplifier circuit and the first transmission filter, the band elimination filter having a pass band comprising a frequency band of the first transmission signal, and having an attenuation band comprising a frequency band of the second transmission signal.

2. The high-frequency front-end module according to claim 1, wherein:
the first transmission amplifier circuit comprises a plurality of amplifiers cascade connected to each other between the input terminal and the output terminal, and
the band elimination filter is connected between the first transmission filter and a cascade connected amplifier at a last stage of the first transmission amplifier circuit.

3. The high-frequency front-end module according to claim 1, wherein the first transmission amplifier circuit and the second transmission amplifier circuit are mounted on the same substrate.

4. The high-frequency front-end module according to claim 1, wherein the predetermined communication band is the first communication band.

5. The high-frequency front-end module according to claim 1, wherein the predetermined communication band is different than the first communication band.

6. The high-frequency front-end module according to claim 1, further comprising:
a second transmission filter in a second signal path connecting the first transmission amplifier circuit and the common terminal, and having a pass band comprising a transmission band of a third communication band that is different from the first communication band and the second communication band; and
a first switch between the band elimination filter, and the first and second transmission filters, the first switch being configured to switch a connection of the band elimination filter between the first transmission filter and the second transmission filter.

7. The high-frequency front-end module according to claim 1, further comprising:
a second transmission filter in a second signal path connecting the first transmission amplifier circuit and the common terminal, and having a pass band comprising transmission band of a third communication band that is different from the first communication band and the second communication band as a pass band; and
a second switch between the first transmission amplifier circuit and the band elimination filter, and between the first transmission amplifier circuit and the second transmission filter, the second switch being configured to switch a connection of the first transmission amplifier circuit between the band elimination filter and the second transmission filter.

8. The high-frequency front-end module according to claim 1, wherein:
the band elimination filter comprises an input terminal and an output terminal,
the high-frequency front-end module further comprises a third switch connected to the input and output terminals of the band elimination filter, and is configured to selectively connect a path passing through the band elimination filter and a path bypassing the band elimination filter,
when all of the first transmission signal is transmitted, the second transmission signal is transmitted, and the reception signal is received, simultaneously, the third switch is in a non-conductive state such that high-frequency signals pass through the band elimination filter, and
when only the first transmission signal but not the second transmission signal is transmitted, the third switch is in a conductive state such that high-frequency signals bypass the band elimination filter.

9. A communication device comprising:
the high frequency front-end module according to claim 1; and
a radio frequency (RF) signal processing circuit configured to process high-frequency signals transmitted and received by the high-frequency front-end module.

* * * * *